(12) United States Patent
Smith et al.

(10) Patent No.: US 8,950,042 B2
(45) Date of Patent: Feb. 10, 2015

(54) CONTINUOUSLY ADAPTIVE FASTENER CLIP

(75) Inventors: Michael Walter Smith, Lake Zurich, IL (US); Daniel James Dickinson, Libertyville, IL (US)

(73) Assignee: Termax Corporation, Lake Zurich, IL (US)

(*) Notice: Subject to any disclaimer, the term of this patent is extended or adjusted under 35 U.S.C. 154(b) by 1508 days.

(21) Appl. No.: 11/870,412

(22) Filed: Oct. 10, 2007

(65) Prior Publication Data

US 2008/0086850 A1    Apr. 17, 2008

Related U.S. Application Data

(60) Continuation-in-part of application No. 11/277,107, filed on Mar. 21, 2006, now Pat. No. 8,627,552, which is a continuation-in-part of application No. 10/906,209, filed on Feb. 9, 2005, now Pat. No. 7,178,850, which is a continuation-in-part of application No. 10/704,094, filed on Nov. 7, 2003, now abandoned, which is a division of application No. 10/164,963, filed on Jun. 7, 2002, now Pat. No. 6,718,599.

(60) Provisional application No. 60/301,364, filed on Jun. 25, 2001, provisional application No. 60/327,814, filed on Oct. 9, 2001, provisional application No. 60/353,515, filed on Feb. 1, 2002.

(51) Int. Cl.
| | |
|---|---|
| *F16B 17/00* | (2006.01) |
| *B60R 13/00* | (2006.01) |
| *F16B 21/07* | (2006.01) |
| *B60R 13/04* | (2006.01) |

(52) U.S. Cl.
CPC ............. *F16B 21/075* (2013.01); *B60R 13/206* (2013.01); *B60R 13/04* (2013.01); *F16B 21/076* (2013.01)
USPC ................. 24/293; 24/294; 24/295; 52/716.7

(58) Field of Classification Search
USPC ............ 24/289–295, 297, 453; 411/508–511, 411/45–48, 182, 480, 533, 173–175; 52/716.7, 718.06, 716.5, 716.6, 716.8, 52/718.03, 704; 296/146.7, 39.1, 214
See application file for complete search history.

(56) References Cited

U.S. PATENT DOCUMENTS

| | | | | |
|---|---|---|---|---|
| 2,100,017 | A | | 8/1932 | Van Uum |
| 2,143,603 | A | * | 1/1939 | Lombard ....................... 411/447 |

(Continued)

OTHER PUBLICATIONS

GM Drawing # 22626098—Clip; Feb. 5, 2003 (to the extent the date and code can be read).

(Continued)

*Primary Examiner* — Jack W Lavinder
(74) *Attorney, Agent, or Firm* — G+J Law Group PLC

(57) ABSTRACT

A fastener clip includes a base plate and a first and second pair of laterally offset legs extending from the base plate. At least one first wing extends from the first pair of laterally offset legs. The at least one first wing has an engagement region. At least one second wing extending from the second pair of laterally offset legs. The at least one second wing has an engagement region, such that a distance between the engagement regions and the base plate is operative to vary continuously according to a slot thickness. The fastener clip is operative for insertion into the slot defined in a first engagement structure, such as a vehicle chassis.

17 Claims, 4 Drawing Sheets

(56) References Cited

U.S. PATENT DOCUMENTS

| | | | |
|---|---|---|---|
| 2,540,396 A | 2/1951 | Krach | |
| 4,043,579 A | 8/1977 | Meyer | |
| 5,263,233 A * | 11/1993 | Kim et al. | 24/295 |
| 5,662,375 A | 9/1997 | Adams | |
| 5,759,004 A * | 6/1998 | Kuffel | 411/508 |
| 5,887,319 A | 3/1999 | Smith | |
| 5,987,714 A | 11/1999 | Smith | |
| 6,021,986 A * | 2/2000 | Murdock | 248/289.11 |
| 6,141,837 A * | 11/2000 | Wisniewski | 24/295 |
| 6,250,708 B1 | 6/2001 | Kurachi | |
| 6,279,207 B1 | 8/2001 | Vassiliou | |
| 6,322,126 B1 | 11/2001 | Kraus | |
| 6,341,466 B1 | 1/2002 | Kehoe | |
| 6,353,981 B1 | 3/2002 | Smith | |
| 6,381,811 B2 * | 5/2002 | Smith et al. | 24/289 |
| 6,629,809 B2 * | 10/2003 | Vassiliou | 411/173 |
| 6,691,380 B2 | 2/2004 | Vassiliou | |
| 6,718,599 B2 | 4/2004 | Dickinson | |
| 6,719,352 B2 | 4/2004 | Arendsen | |
| 6,796,006 B2 | 9/2004 | Hansen | |
| 6,868,588 B2 | 3/2005 | Dickinson | |
| 7,849,567 B2 | 12/2010 | Dickinson | |
| 2004/0083582 A1 | 5/2004 | Dickinson | |
| 2005/0217082 A1 | 10/2005 | Vassiliou | |
| 2005/0236861 A1 * | 10/2005 | Slobodecki et al. | 296/39.1 |
| 2005/0246870 A1 | 11/2005 | Dickenson | |
| 2006/0071475 A1 * | 4/2006 | James et al. | 285/420 |

OTHER PUBLICATIONS

GM Drawing # 11609651—Nut Push-In Feb. 27, 2003.
GM Drawing # 11609651—Clip Feb. 7, 2005.

\* cited by examiner

CONTINUOUSLY ADAPTIVE FASTENER CLIP

RELATED APPLICATIONS

This is a continuation in part application claiming priority from an application entitled "Multicontact Adaptive Fastener Clip" having a Ser. No. 11/277,107, having a filing date of Mar. 21, 2006, which is a continuation in part of U.S. patent application Ser. No. 10/906,209, now U.S. Pat. No. 7,178,850 filed on Feb. 9, 2005, the entire disclosure of which is incorporated herein by reference all of which are incorporated herein by reference in their entirety, and a continuation in part of U.S. patent application Ser. No. 10/704,094, now abandoned, entitled, "Vehicles Comprising Assemblies Having Fastener with Ergonomically Balanced Removal to Insertion Force Ratio", which is a divisional Application of non-provisional application Ser. No. 10/164,963, filed Jun. 7, 2002, now U.S. Pat. No. 6,718,599, which claims priority to provisional applications 60/301,364, filed Jun. 25, 2001, 60/327,814, filed Oct. 9, 2001, and 60/353,515 filed Feb. 1, 2002, all of which are incorporated herein by reference in their entirety.

FIELD OF THE INVENTION

The invention relates generally to devices for fastening objects, and more particularly to a fastener clip for insertion into an engagement structure, such as a vehicle chassis, a hollow substrate, a wall, a plate or any suitable surface.

BACKGROUND OF THE INVENTION

A number of devices and fasteners are currently available for fastening panels, such as body panels and automobile interior trimpiece panels, to the chassis of a vehicle. As used herein, a body panel refers to, for example, any interior or exterior body panel on a vehicle, a plastic interior trimpiece or any interior trimpiece. Additionally, the panel may be any suitable exterior body panel, such as a fender, bumper, quarter panel or door panel. The chassis of the vehicle may include any substrate, plate, body panel, structural framework, chassis component or subcomponent, wall or any suitable object.

These body panels typically are required to attach to the chassis of an automobile with a relatively low level of insertion force while providing a high level of extraction force suitable to maintain attachment of the panel to the chassis. However, these conventional fastener devices instead provide approximately relatively equal levels of insertion and extraction force. Further, the fastener device is typically required to secure the panel to the chassis that may have sheet metal with different thicknesses throughout. Also, the fastener device fastens under a variety of environmental conditions, such as in the presence of vibration at various levels of amplitude and frequency. For example, the fastener device should prevent or minimize the amount of buzzing, rattling or any other type of noise that may cause attention to the occupants of the vehicle or otherwise weaken the attachment. Further yet, another requirement of the fastener device is that the fastener device accommodates various levels of sheet metal thicknesses, and production tolerances, such as various dimensions amongst, for example, the body panels as well as the vehicle chassis. Conventional fastener devices typically do not adequately fasten to a range of sheet metal thicknesses and do not minimize or eliminate buzzing and rattling and do not sufficiently accommodate variations in production tolerances.

Fastener clips are known for attaching body panels to an automobile chassis. For example, fastener clips are known having a base plate and four stepped arms extending from the base plate. Each stepped arm includes four incremental steps (stair-steps) suitable for engaging a slot in a vehicle chassis with one of the steps on each arm. The incremental steps allow for engagement, however, in only one of the four discrete step positions rather than over a continuous range of engagement positions. Further, each step has a relatively large rise and run so that, once inserted, movement of the fastener clip within the range of a step size may occur, resulting in wear and/or the generation of noise, including buzzing and rattling as a result of vibrations occurring within the vehicle. Also, the steps typically cut onto each arm during manufacture and also require twisting of each wing on the fastener clip in order to engage the slot in the vehicle chassis. As a result, only an edge or a portion of an edge of each of the steps engages the hole in the vehicle slot.

If the sheet metal varies in thickness or if tolerances in production of the slot in the vehicle chassis or in the trimpiece exist, for example, then engagement of one portion of the hole in the chassis with one of the arms may not provide suitable frictional engagement or otherwise result in movement. Further, less than all four of the arms will make engagement with the slot of the vehicle chassis. Twisting of the body panel will be likely more prevalent because less than four contact points are actually made with the slot of the vehicle chassis. As a result, wear, squeaks, rattles, buzzing, corrosion and loss of elasticity and loss of sealing may result, especially after years of vehicle operation and exposure to vibration and other environmental conditions.

DETAILED DESCRIPTION OF THE PREFERRED EMBODIMENTS

Figure 1:
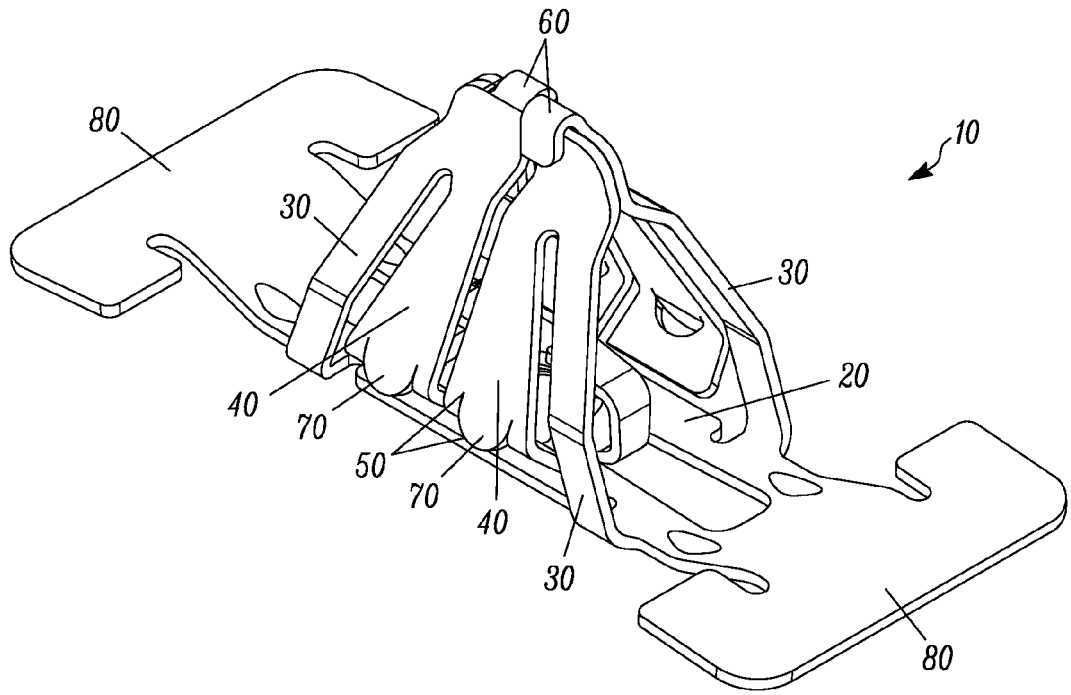
FIG. 1 is a perspective view of a fastener clip according to one embodiment.

A fastener clip includes a base plate and a first and second pair of laterally offset legs extending from the base plate. At least one first wing extends from the first pair of laterally offset legs. The at least one first wing has an engagement region. At least one second wing extends from the second pair of laterally offset legs. The at least one second wing has an engagement region. The fastener clip adapts to different frame thicknesses such that a distance between the engagement regions and the base plate or frame is operative to vary continuously according to a slot thickness. The range of slot thicknesses varies continuously from a minimum thickness to a maximum thickness. For example, the minimum thickness may be 0.25 mm or less and the maximum thickness may be 6.0 mm or more. The fastener clip is operative for insertion into the slot defined in a first engagement structure, such as a vehicle chassis.

Among other advantages, the fastener clip relatively easily facilitates attachment of a body panel, such as an interior or exterior body panel with the first engagement structure, such as the vehicle chassis, such that the same fastener clip may be used with different sheet metal thicknesses. For example, a vehicle may have different sheet metal thicknesses at various parts of the vehicle. Since the fastener clip adapts automatically to different sheet metal thicknesses, the same fastener clip may be used throughout the vehicle thus eliminating the need for specific fastener clips for specific slot thicknesses.

The base plate is operative to bend about the end brackets in response to an insertion force applied to the base plate such that the legs cause the wings to increase the distance between the engagement regions and the base plate or frame until at least one of the engagement regions engage the slot. Thus, the engagement portion adapts to variations of sheet metal thicknesses, such as variations in the thickness of various portions of the vehicle chassis and variations in body panels to maintain a high level of extraction force relative to the insertion force. For example, during engagement the engagement portion continuously adapts to variations in thickness and dimensions of the vehicle chassis and/or in the body panel and other variations. Thus, only a single fastener clip can be used with a vehicle or application even if the thickness of the sheet metal varies substantially, such as for example from 0.5 mm to 3.5 mm. According to one embodiment, each wing independently engages the slot of the vehicle chassis in a continuous rather than discrete manner. Each wing adapts to changes, such as chassis flexing and vibrations of a wide range of amplitudes and frequencies, and other conditions.

The engagement portion, along with an optional engagement tab on each wing, permits relatively easy insertion of the fastener clip into a slot formed within the vehicle chassis while providing a relatively high level of extraction force from the vehicle chassis. Assembly of the body panel onto the vehicle chassis requires a relatively low level of insertion force compared to the extraction force, and as a result provides many ergonomic advantages. For example, the relatively low level of insertion force is particularly advantageous for assembly line operators who repetitively insert body panels onto the vehicle chassis. The relatively low level of insertion force required for inserting the body panel into the vehicle chassis may result in fewer injuries to the assembly workers, including injuries related to repetitive stress syndrome. Further by eliminating multiple fasteners for different sheet metal thicknesses, confusion during assembly is eliminated since the same type fastener may be used for all slots. Thus, an assembly worker need not worry about selecting the wrong fastener for different slot thicknesses.

The relatively high level of extraction force, characteristic of the fastener clip, securely attaches the body panel, such as an interior trim piece, to the vehicle chassis. Further, the fastener clip continuously adapts to changes in environmental conditions such as vehicle flexing, vibration and thermal expansion. For example, the fastener clip may adapt to changes in thermal expansion, especially due to the differences in thermal expansion rates between dissimilar metals with respect to the vehicle chassis components and/or between plastic components such as the interior trim panels attached to the metal vehicle chassis. Yet another advantage is that the fastener clip is relatively easy to manufacture using relatively inexpensive manufacturing processes and materials. The use of the fastener clip decreases production costs, increases worker productivity and efficiency and decreases overall vehicle assembly costs. The fastener clip securely attaches a body panel to the vehicle chassis, such that the fastener clip improves reliability both in the short term and in the long term, while further improving vehicle safety and quality.

The fastener clip dampens vibrations and thus eliminates or substantially reduces buzz, squeak and rattles. Further, the fastener clip continuously adapts to changes in environmental conditions such as vehicle flexing, vibration and thermal expansion. For example, the fastener clip may adapt to changes in thermal expansion, especially due to the differences in thermal expansion rates between dissimilar metals with respect to the vehicle chassis components and/or between plastic components such as the interior trim panels attached to the metal vehicle chassis. The fastener clip may also fasten to plastic and/or metal engagement structures. The fastener clip may be made of anti-corrosive material such as plastic or treated metal to provide long reliable service life.

FIG. 1 is a perspective view of a fastener clip 10 according to one embodiment. The fastener clip 10 includes a base plate 20 and a first and second pair of laterally offset legs 30 extending from the base plate 20. At least one first wing 40 extends from the first pair of laterally offset legs 30. The at least one first wing 40 has an engagement region 50. At least one second wing 40 extends from the second pair of laterally offset legs 30. The at least one second wing 40 has an engagement region 50. Although reference number 30 refers to both pairs of legs and reference number 40 refers to both wings 40, it is understood that the at least one first wing 40 corresponds to the first pair of legs 30 and the at least one second wing 40 corresponds to the second pair of legs 30. Although the fastener clip 10 is shown in FIGS. 1-10 with four legs 30 and four wings 40, any suitable number of legs 30 and wings 40 may be used. For example, two legs 30 and two wings 40 may be used, two legs 30 and four wings 40 may be used, three legs 30, four legs 30 an so forth may be used.

Figure 2:
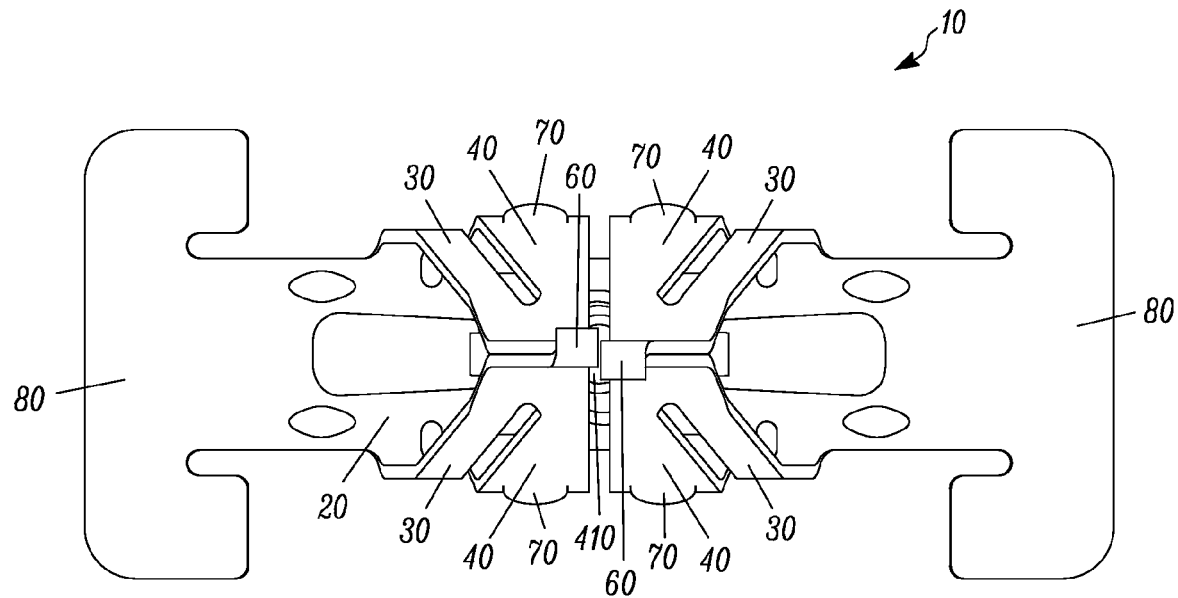
FIG. 2 is a top view of the fastener clip according to another embodiment.

FIG. 2 is a top view of the fastener clip 10 according to another embodiment. First locking tabs 60 are on the first pair of laterally offset legs 30 at an end opposed the base plate 20. Similarly, second locking tabs 60 are on the second pair of laterally offset legs 30 at an end opposed the base plate 20. For example, the locking tabs 60 touch or are close together to prevent or reduce movement between the pair of legs 30 and strengthen the fastener clip 10 to improve engagement.

According to one embodiment, the legs 30 and arms 40 may have any suitable shape, such as for example, at least one of: the legs and the arms, is tapered, straight, curved or any suitable shape.

Figure 3:
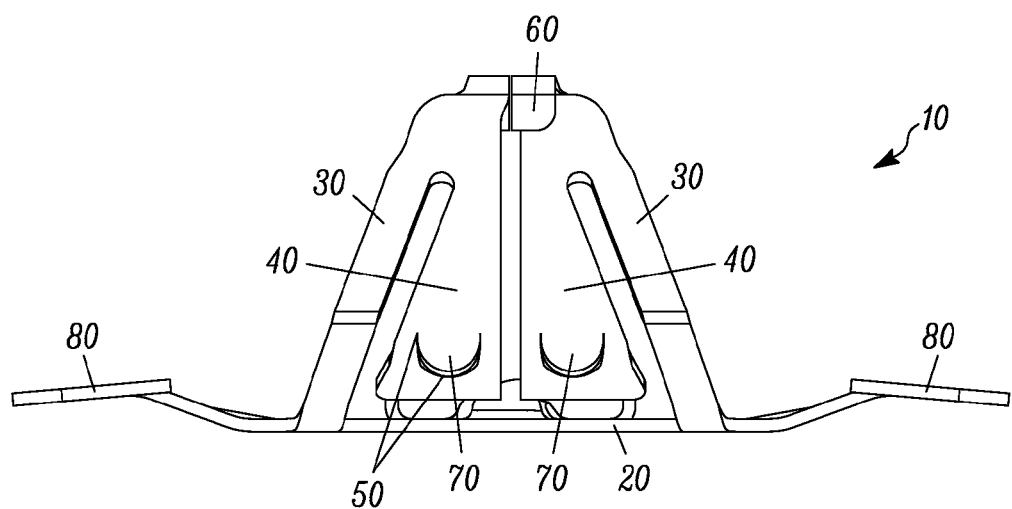
FIG. 3 is a side view of the body panel assembly according to one embodiment.

FIG. 3 is a side view of the fastener clip 10 according to one embodiment. At least one of the engagement regions 50 further comprises an engagement tab 70 operative to engage at least a portion of the slot. The engagement tabs 70 are operative to engage the slot 540 (FIG. 5) and resist withdrawal of the fastener clip 10 from the plate slot 540. For example, the engagement tab 70 may be a protrusion in a non-planar orientation relative to an end of the wings 40. According to an alternative embodiment, the engagement regions 50 may be a depressed portion, protrusions, cuts, points, curves, and/or steps.

According to one embodiment, the fastener clip 10 comprises end brackets 80 at opposite ends of the base plate. Thus, the base plate 20 is operative to bend about the end brackets 80 in response to an insertion force applied to the base plate 20 such that the legs cause the wings 40 to increase the distance between the engagement regions 50 and the base plate 20 (prior to bending) until at least one of the engagement regions 50 engage the slot 540. For example, a force on the base plate 20 imparts a torque on the at least one first wing 40 and an opposite torque applied on the at least one second wing 40.

Figure 4:
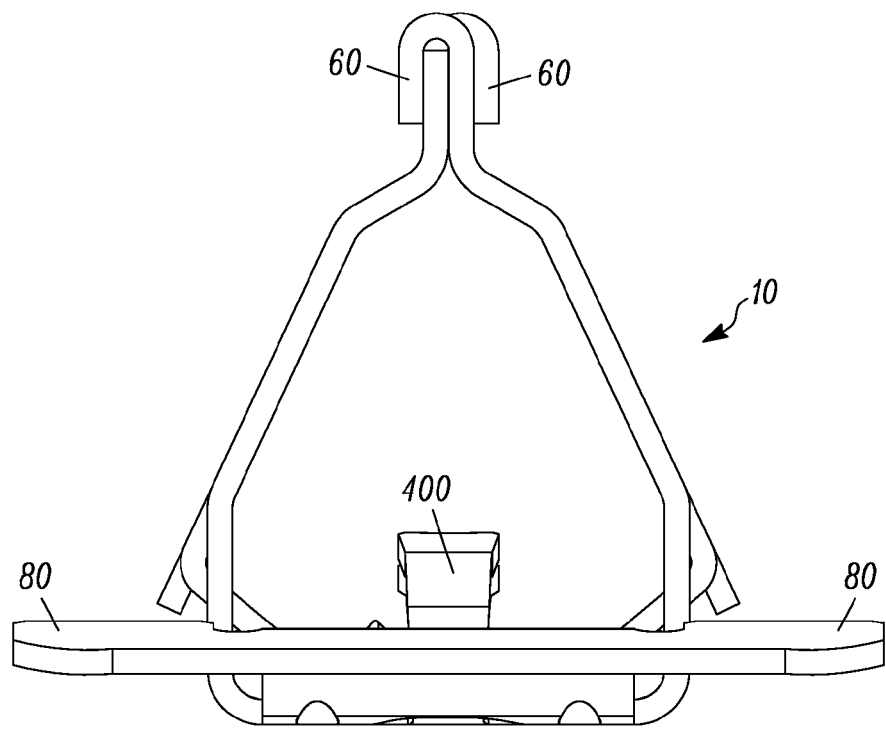
FIG. 4 is another side view of the fastener clip shown in FIG. 2 rotated 90 degrees.

FIG. 4 is another side view of the fastener clip 10 shown in FIG. 2 rotated 90 degrees. At least two threading projections 400 protrude from the base plate 20, such that the at least two threading projections 400 point to each other to create a frictional opening 410. According to one embodiment, the fastener clip 10 further includes a side wing to engage a narrow edge of the slot wherein the optional engagement regions 50 on the first and second wings 40 engage a relatively wide edge of the slot.

According to an alternative embodiment, a coating is applied on the fastener clip made of at least one of nickel plating, zinc plating, rubber, plastisol, plastic, acetal, polyacetal, polyoxymethylene, nylon, fiberglass and/or carbon fiber.

Figure 5:
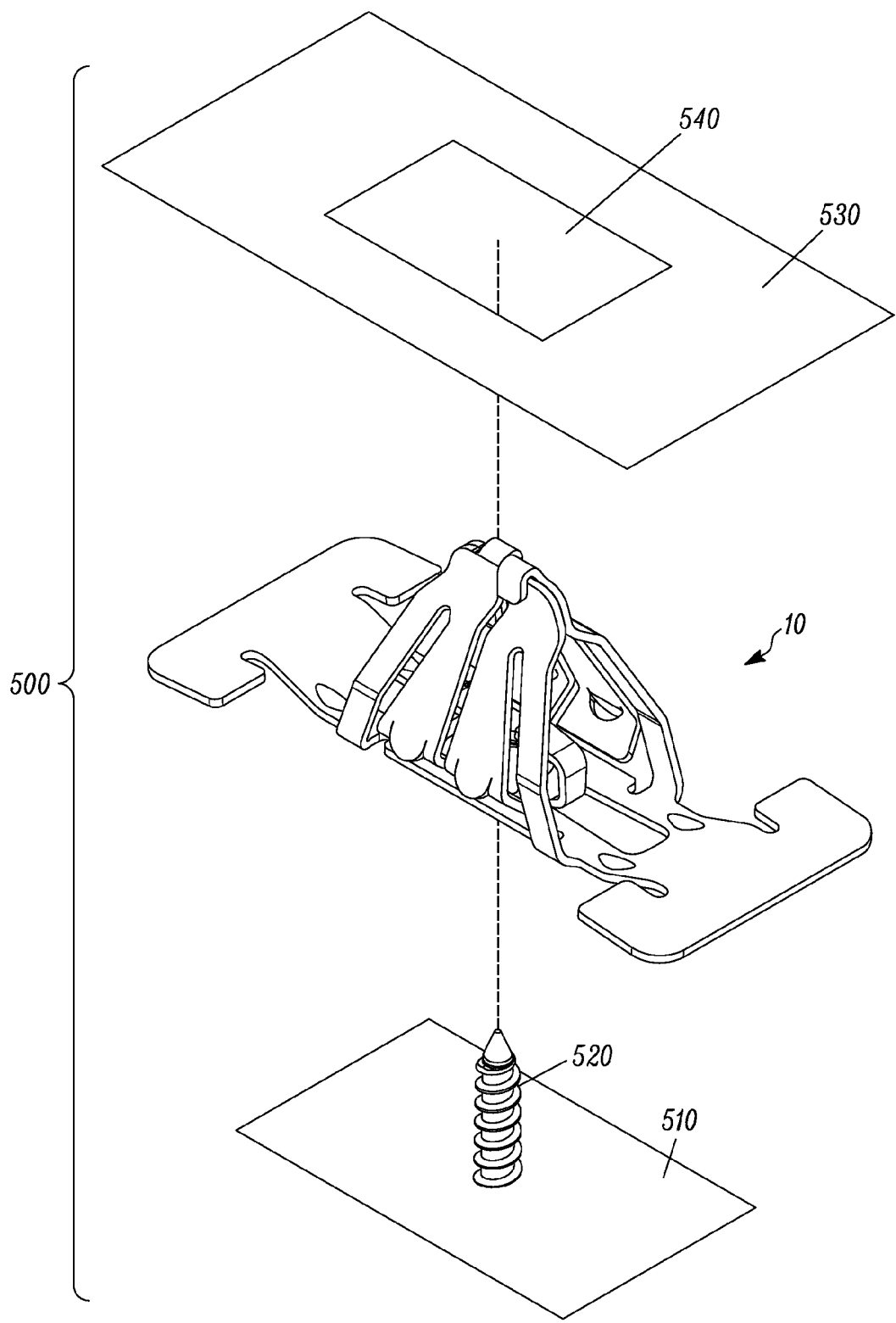
FIG. 5 is a perspective view of a body panel assembly according to one embodiment.

FIG. 5 is a perspective view of a body panel assembly 500 according to one embodiment. The body panel assembly 500 comprises a body panel 510 having a mounting member and fastener such as a screw, bolt, rivet or any suitable fastener 520 to engage the fastener clip 10. The fastener clip 10 is operatively inserted into a slot 540 defined in a first engagement structure 530, such as a vehicle chassis or frame. The fastener clip 10 adapts to different frame 530 thicknesses such that a distance between the engagement regions 50 and the base plate 20 is operative to vary continuously according to a slot 540 thicknesses.

According to one embodiment, the fastener clip 10 is made of: steel or any suitable metal. According to another embodiment, the fastener clip 10 is made of: plastic, acetal, polyacetal, polyoxymethylene, nylon, fiberglass and/or carbon fiber, however any suitable material may be used in any combination such as steel, tin and/or any suitable metal. The body panel 510 may be constructed from plastic or from any suitable material such as wood, steel, aluminum, magnesium, carbon fiber or any suitable material.

Figure 6:
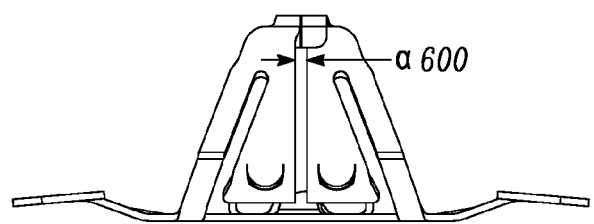
FIG. 6 is a side view of the fastener clip prior to engagement to a frame.

FIG. 6 is a side view of the fastener clip 10 prior to engagement to the frame 530. The angle between the legs 30 is shown as alpha0 600. FIGS. 7 through 10 are side views of the fastener clip 10 affixed to a frame 530 having various thicknesses. The fastener clip 10 is operative for insertion into the slot 520 defined in a first engagement structure 530, such as a frame or vehicle chassis having various thicknesses.

Figure 7:
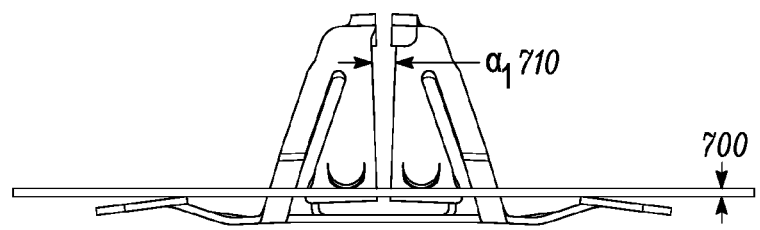
FIG. 7 is a side view of the fastener clip affixed to a frame having a first thickness in accordance with an exemplary embodiment.

FIG. 7 shows a frame 530 having a first thickness 700 resulting in an angle between the legs 30 shown as alpha1 710. The first and second pair of legs 30 spread so that alpha1 710 has an angle greater than alpha0 600 resulting in tabs 70 rising to accommodate the frame 530 having a first thickness 700.

Figure 8:
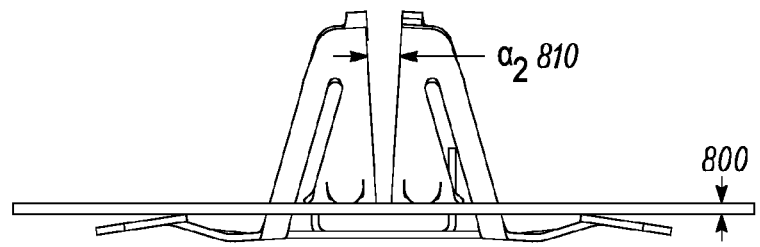
FIG. 8 is a side view of the fastener clip affixed to a frame having a second thickness in accordance with an exemplary embodiment.

FIG. 8 shows a frame 530 having a second thickness 800 resulting in an angle between the legs 30 shown as alpha2 810 in accordance with an exemplary embodiment. The first and second pair of legs 30 spread so that alpha2 810 has an angle greater than alpha0 600 resulting in tabs 70 rising to accommodate the frame 530 having the second thickness 800.

Figure 9:
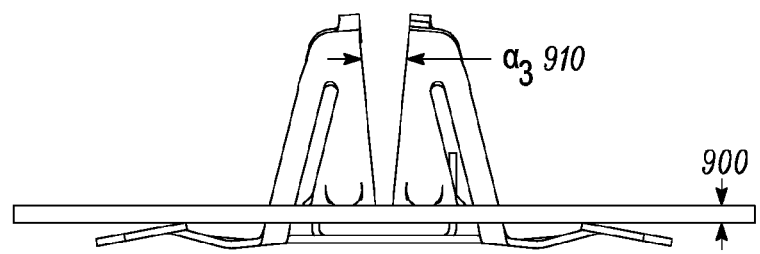
FIG. 9 is a side view of the fastener clip affixed to a frame having a third thickness in accordance with an exemplary embodiment.

FIG. 9 shows a frame 530 having a third thickness 900 resulting in an angle between the legs 30 shown as alpha3 910 in accordance with an exemplary embodiment. The first and second pair of legs 30 spread so that alpha3 910 has an angle greater than alpha0 600 resulting in tabs 70 rising to accommodate the frame 530 having the third thickness 900.

Figure 10:
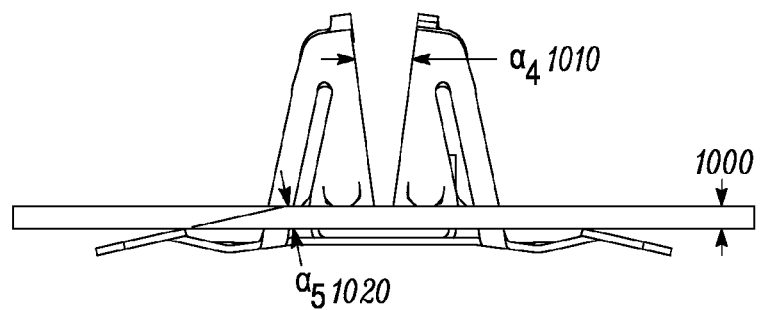
FIG. 10 is a side view of the fastener clip affixed to a frame having a fourth thickness in accordance with an exemplary embodiment.

FIG. 10 shows a frame 530 having a third thickness 1000 resulting in an angle between the legs 30 shown as alpha4 1010 accordance with an exemplary embodiment. Note that as the thickness of the frame 530 increases, alpha4 1010 and the angle between the legs 30 increases as well as an angle alpha 5 1020 between the base plate or frame 530 and the engagement region 50 and the portion of the end bracket 80 touching the frame 530. The fastener clip 10 may securely fasten to a slot 540 having a range of thicknesses varying continuously from a minimum thickness to a maximum thickness. Although four exemplary thicknesses are shown, the thickness of the frame 530 may range through any number (non finite) continuously from a minimum to a maximum thickness. For example, the minimum thickness may be 0.25 mm or less and the maximum thickness may be 6.0 mm or more.

It is understood that the implementation of other variations and modifications of the present invention in its various aspects will be apparent to those of ordinary skill in the art and that the invention is not limited by the specific embodiments described. It is therefore contemplated to cover by the present invention any and all modifications, variations or equivalents that fall within the spirit and scope of the basic underlying principles disclosed and claimed herein.

What is claimed is:

1. A fastener clip for insertion into a slot of a frame, comprising:
 a base plate;
 a first pair of laterally offset legs extending from the base plate;
  at least one first wing extending from the first pair of laterally offset legs, the at least one first wing having an engagement region, the engagement region is spaced from the base plate by a distance and the distance is capable of varying in response to a slot thickness
 a second pair of laterally offset legs extending from the base plate;
  at least one second wing extending from the second pair of laterally offset legs,
   the at least one second wing having an engagement region, the engagement region is spaced from the base plate by a distance and the distance is capable of varying in response to a slot thickness, and
 end brackets at opposite ends of the base plate, wherein the base plate is operative to bend about the end brackets in response to an insertion force applied to the base plate such that the legs cause the wings to increase the distance between the engagement regions and the base plate until at least one of the engagement regions engage the slot.

2. The fastener clip of claim 1, wherein at least one of the engagement regions further comprises an engagement tab operative to engage at least a portion of the slot.

3. The fastener clip of claim 2, wherein the engagement tab is a protrusion in a non-planar orientation relative to an end of the wings.

4. The fastener clip of claim 2, wherein the engagement tab is at least one of: rounded, bulbous, stepped, angled, and depressed.

5. The fastener clip of claim 1, further comprising at least two threading projections protruding from the base plate, such that the at least two threading projections point to each other to create a frictional opening.

6. The fastener clip of claim 1, wherein a force on the base plate imparts a torque on the at least one first wing and an opposite torque applied on the at least one second wing.

7. The fastener clip of claim 1, further comprising a coating on the fastener clip made of at least one of: rubber, plastisol, plastic, acetal, polyacetal, polyoxymethylene, nylon, fiberglass and carbon fiber.

8. The fastener clip of claim 1, wherein at least one of: the legs and the wings, is tapered.

9. A fastener assembly comprising:
a body panel comprising a mounting member;
a fastener clip for insertion into a slot of a frame, comprising:
    a base plate coupled to the mounting member;
    a first pair of laterally offset legs extending from the base plate;
        at least one first wing extending from the first pair of laterally offset legs,
            the at least one first wing having an engagement region, the engagement region is spaced from the base plate by a distance and the distance is capable of varying in response to a slot thickness;
    a second pair of laterally offset legs extending from the base plate;
        at least one second wing extending from the second pair of laterally offset legs,
            the at least one second wing having an engagement region, the engagement region is spaced from the base plate by a distance and the distance is capable of varying in response to a slot thickness,
    a first locking tab on the first pair of laterally offset legs at an end opposed the base plate;
    a second locking tab on the second pair of laterally offset legs at an end opposed the base plate; and
    wherein the base plate is operative to bend about end brackets in response to an insertion force applied to the base plate such that the legs cause the wings to increase the distance between the engagement regions and the base plate until at least one of the engagement regions engage the slot.

10. The fastener assembly of claim 9, wherein at least one of the engagement regions further comprises an engagement tab operative to engage at least a portion of the slot.

11. The fastener assembly of claim 10, wherein the engagement tab is a protrusion in a non-planar orientation relative to an end of the wings.

12. The fastener assembly of claim 9, further comprising at least two threading projections protruding from the base plate, such that the at least two threading projections point to each other to create a frictional opening and to engage a fastener also engaged to the mounting member.

13. The fastener assembly of claim 9, wherein a force on the base plate imparts a torque on the at least one first wing and an opposite torque applied on the at least one second wing.

14. A vehicle comprising:
a vehicle chassis having a slot;
a body panel including a mounting member;
a fastener clip for insertion into the slot comprising:
    a base plate coupled to the mounting member;
    a first pair of laterally offset legs extending from the base plate;
        at least one first wing extending from the first pair of laterally offset legs,
            the at least one first wing having an engagement region, the engagement region is spaced from the base plate by a distance and the distance is capable of varying in response to a slot thickness;
    a second pair of laterally offset legs extending from the base plate;
        at least one second wing extending from the second pair of laterally offset legs,
            the at least one second wing having an engagement region, the engagement region is spaced from the base plate by a distance and the distance is capable of varying in response to a slot thickness, and
    end brackets at opposite ends of the base plate, wherein the base plate is operative to bend about the end brackets in response to an insertion force applied to the base plate such that the legs cause the wings to increase the distance between the engagement regions and the base plate until at least one of the engagement regions engage the slot.

15. The vehicle of claim 14, wherein at least one of the engagement regions further comprises an engagement tab operative to engage at least a portion of the slot.

16. The vehicle of claim 15, wherein the engagement tab is a protrusion in a non-planar orientation relative to an end of the wings.

17. The vehicle of claim 14 further comprising:
a first locking tabs on the first pair of laterally offset legs at an end opposed the base plate; and
a second locking tabs on the second pair of laterally offset legs at an end opposed the base plate.

* * * * *